UNITED STATES PATENT OFFICE.

FRITZ HOFMANN AND CARL COUTELLE, OF ELBERFELD, GERMANY, ASSIGNORS TO FARBENFABRIKEN VORM. FRIEDR. BAYER & CO., OF ELBERFELD, GERMANY, A CORPORATION OF GERMANY.

CAOUTCHOUC SUBSTANCE AND PROCESS OF MAKING SAME.

1,062,915.

No Drawing.

Specification of Letters Patent. Patented May 27, 1913.

Application filed March 20, 1911. Serial No. 615,670.

*To all whom it may concern:*

Be it known that we, FRITZ HOFMANN and CARL COUTELLE, doctors of philosophy, chemists, citizens of the German Empire, residing at Elberfeld, Germany, have invented new and useful Improvements in New Caoutchouc Substances and Processes of Making Same, of which the following is a specification.

By our earlier applications Ser. Nos. 578607, 594557 and 578608 the production of caoutchouc like substances is described, which may replace natural caoutchouc in its chemical and technical application. The processes for their production consist in converting methylerythrenes or erythrene into caoutchouc like substances.

It has now been found that by using mixtures of the starting materials mentioned in the above applications (erythrene and its substitution products) new caoutchouc-like substances can be advantageously produced, with properties different from those of the caoutchouc-like substances above referred to. Caoutchouc-like substances can be thus produced of a composite nature, made up of the polymerization products of the mixtures of erythrene hydrocarbons, and containing such products in most intimate intermixture. A more nearly homogeneous product and a more intimate intermixture can thus be produced by mixing the hydrocarbons before or during the polymerization reaction than is possible by mixing the individual and isolated caoutchoucs already formed.

In order to illustrate the new process more fully the following example is given, the parts being by weight:—A mixture of 100 parts of isoprene and 100 parts of cooled erythrene is heated for 3 weeks in an autoclave to 70° C. A very tough and elastic substance is thus obtained made up of the caoutchouc-like substance together with any remaining unchanged hydrocarbons and by-products. By treatment of this substance with steam such hydrocarbons and volatile by-products, if present, can be removed and the caoutchouc-like substance which is insoluble in acetone obtained. Mixtures of alpha-methylerythrene with isoprene or erythrene, etc., may be used. The process proceeds in an analogous manner on using agents promoting the polymerization e. g. acids or acid salts, etc.

The new caoutchouc substances are white substances the color of which does not change. They swell up with chloroform or benzene to white hyaline substances from which the liquid can be poured off. They are free from protein substances, which are always contained in the natural caoutchouc and play an important part in it with regard to the elasticity of the natural caoutchouc. They form ozonids being thick oils, nitrosites and brom addition products. These ozonids, nitrosites and brom-addition products differ with the different composite caoutchouc products, and correspond to these different products, and thus indirectly to the particular mixtures of hydrocarbons of which the composite caoutchoucs are polymerization products. Thus the product produced as above described from a mixture of isoprene and erythrene forms an ozonid, or mixture of ozonids, which upon decomposition with water yields a mixture of oxygen-containing decomposition products among which succinic aldehyde and levulinic aldehyde are found.

We claim:—

1. The process of producing a caoutchouc-like substance which comprises polymerizing a mixture of erythrene hydrocarbons including isoprene.

2. The process of producing a caoutchouc-like substance which comprises heating a mixture of erythrene hydrocarbons including isoprene under caoutchouc-forming conditions until a product results insoluble in acetone.

3. The process of producing a caoutchouc-like substance which comprises polymerizing a mixture of erythrene hydrocarbons including erythrene and a methylerythrene.

4. The process of producing a caoutchouc-like substance which comprises heating a mixture of erythrene hydrocarbons including erythrene and a methyl-erythrene under caoutchouc-forming conditions until a product results insoluble in acetone.

5. The process of producing a caoutchouc-like substance which comprises polymerizing a mixture of erythrene hydrocarbons including erythrene and isoprene.

6. The process of producing a caoutchouc-like substance which comprises heating a mixture of erythrene hydrocarbons including erythrene and isoprene under caoutchouc-forming conditions until a product results insoluble in acetone.

7. As a new product a caoutchouc-like substance comprising a caoutchouc-like polymerization product of a mixture of erythrene hydrocarbons including isoprene which product forms a nitrosite, ozonid and brom-addition product, the ozonid upon decomposition with water yielding a plurality of oxygen-containing decomposition products including levulinic aldehyde.

8. As a new product a caoutchouc-like substance comprising a caoutchouc-like polymerization product of a mixture of erythrene hydrocarbons including erythrene and a methyl-erythrene which product forms a nitrosite, ozonid and brom-addition product, the ozonid upon decomposition with water yielding a plurality of oxygen-containing decomposition products including succinic aldehyde and a methyl derivative of succinic aldehyde.

9. As a new product a caoutchouc-like substance comprising a caoutchouc-like polymerization product of a mixture of erythrene hydrocarbons including isoprene and erythrene which product forms a nitrosite, ozonid and brom-addition product, the ozonid upon decomposition with water yielding a plurality of oxygen-containing decomposition products including succinic aldehyde and levulinic aldehyde.

10. As a new product a caoutchouc-like substance comprising a caoutchouc-like polymerization product of a mixture of erythrene hydrocarbons, the ratio of carbon to hydrogen in such caoutchouc-like substance being greater than that in isoprene caoutchouc.

In testimony whereof we have hereunto set out hands in the presence of two subscribing witnesses.

FRITZ HOFMANN. [L. S.]
CARL COUTELLE. [L. S.]

Witnesses:
ALFRED HENKEL,
A. POSEN.